(12) United States Patent
Kobayashi et al.

(10) Patent No.: US 6,381,204 B1
(45) Date of Patent: *Apr. 30, 2002

(54) POWER SAVE MODE CONTROL METHOD AND STORAGE UNIT

(75) Inventors: Shinya Kobayashi; Shigenori Yanagi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,634

(22) Filed: Jul. 13, 1998

(30) Foreign Application Priority Data

Jan. 20, 1998 (JP) .......................... 10-008989

(51) Int. Cl.[7] .................................. G11B 7/00
(52) U.S. Cl. .................................. 369/47.3; 369/53.37
(58) Field of Search .................. 369/54, 58, 56, 369/53, 47.3, 53.37

(56) References Cited

U.S. PATENT DOCUMENTS 5,345,347 A  *  9/1994  Hopkins et al. ............. 369/53
5,400,190 A  *  3/1995  Miura ........................ 369/53
5,442,608 A  *  8/1995  Umeda et al. ............ 369/44.27
5,544,138 A  *  8/1996  Bajorek et al. ............... 369/53
5,745,451 A  *  4/1998  Mukawa et al. .............. 369/53
5,828,642 A  * 10/1998  Skarda ...................... 369/77.2
5,959,280 A  *  9/1999  Kamatani ................... 369/53
5,982,570 A  * 11/1999  Koizumi et al. ............. 369/53

FOREIGN PATENT DOCUMENTS

| JP | 60-105026 | 6/1985 |
| JP | 63-221391 | 9/1988 |
| JP | 64-13612  | 1/1989 |
| JP | 2-192275  | 7/1990 |
| JP | 4-74028   | 3/1992 |
| JP | 6-162223  | 6/1994 |

* cited by examiner

Primary Examiner—Nabil Hindi
(74) Attorney, Agent, or Firm—Greer, Burns & Crain, Ltd.

(57) ABSTRACT

A power save mode control method for a storage unit which is loadable with recording mediums, having different formats, includes the steps of detecting whether or not a format of a recording medium loaded into the storage unit is a first format which is preset, and setting a clock frequency of a clock within the storage unit to a first frequency with respect to the recording medium having the first format when changing a mode of the storage unit to a power save mode if the loaded recording medium has the first format.

15 Claims, 11 Drawing Sheets

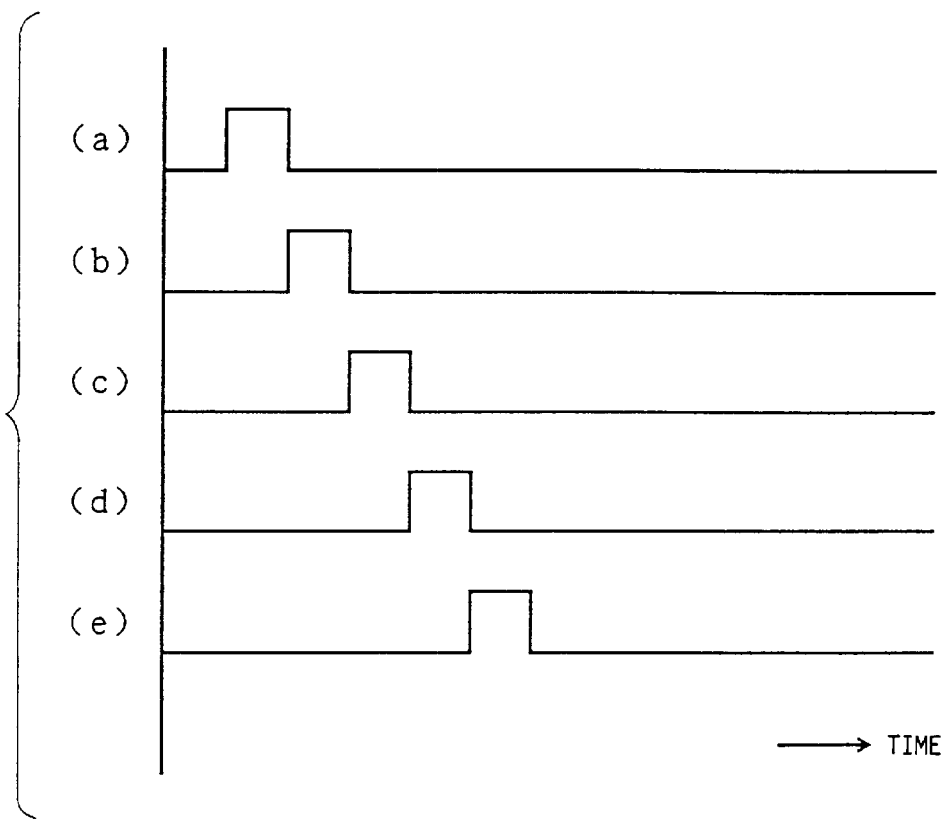

POWER SAVE MODE CONTROL METHOD AND STORAGE UNIT

BACKGROUND OF THE INVENTION

The present invention generally relates to power save mode control methods and storage units, and more particularly to a power save mode control method for controlling a power save mode of a storage unit which supports recording mediums having different formats, and to a storage unit which employs such a power save mode control method.

In this specification, the recording mediums having different formats include recording mediums having different storage capacities.

In disk units which support optical disks, magneto-optic disks and the like, an operation mode switches to a power save mode when an operating instruction from a host unit is not received for a predetermined time, so as to reduce the power consumption. In the power save mode, a part of the disk unit is stopped. For this reason, when restoring the operation mode from the power save mode to a read/write mode or the like, it is desirable to quickly restore the stopped part of the disk unit to the operating state.

An optical disk unit, for example, is provided with a plurality of power save modes depending on the time for which no operating instruction is received from the host unit, and the power consumption of the optical disk unit is efficiently reduced. In one power save mode, clocks for setting a crystal oscillator and a synthesizer which are used to set a cutoff frequency of an automatic filter tuning (AFT) circuit within the optical disk unit are stopped. On the other hand, when restoring the operation mode of the optical disk unit from this one power save mode to the read/write mode, an initial sequence of a read circuit within the optical disk unit is carried out to set the clocks of the crystal oscillator and the synthesizer. Such an initial sequence of the read circuit is carried out regardless of the power save mode from which the operation mode of the optical disk unit is restored to the read/write mode.

First, in a case where an optical disk having a storage capacity of 640 MB is loaded into the optical disk unit in a state where the clocks of the crystal oscillator and the synthesizer are preset with respect to the optical disk having the storage capacity of 640 MB, the operation of restoring the operation mode of the optical disk unit from the power save mode to the read/write mode is carried out as follows. For the sake of convenience, it is assumed that the operation mode of the optical disk unit is the power save mode from a time t1, and that a read/write instruction is received from the host unit at a time t2.

From the time t2, the cutoff frequency of the AFT circuit described above is set based on the preset clocks of the crystal oscillator and the synthesizer. A read/write process is carried out from a time t3 to a time t4, where t1<t2<t3<t4. Accordingly, a restoration time required to restore the optical disk unit from the power save mode to the read/write mode corresponds to the time interval from the time t2 to the time t3.

The optical disks supported by the optical disk unit include optical disks having different formats. For this reason, the clocks of the crystal oscillator and the synthesizer within the optical disk unit must be set depending on the format of the optical disk loaded into the optical disk unit.

FIG. 1 is a time chart for explaining the operation of restoring the operation mode of the optical disk unit from the power save mode to the read/write mode according to the prior art in the case where an optical disk having a storage capacity of 230 MB is loaded into the optical disk unit in a state where the clocks of the crystal oscillator and the synthesizer are preset with respect to the optical disk having the storage capacity of 640 MB. In this case, it is necessary to carry out the initial sequence of the read circuit within the optical disk unit and to change the setting so that the clocks of the crystal oscillator and the synthesizer are set with respect to the optical disk having the storage capacity of 230 MB. In FIG. 1, the operation mode of the optical disk unit is the power save mode from the time t1, and the read/write instruction is received from the host unit at the time t2.

In this case, there is a possibility that the clocks of the crystal oscillator and the synthesizer are set with respect to the optical disk having the storage capacity of 230 MB. For this reason, the initial sequence of the read circuit within the optical disk unit is carried out from the time t2 shown in FIG. 1, to change the setting so that the clocks of the crystal oscillator and the synthesizer are set with respect to the optical disk having the storage capacity of 640 MB. From a time t2a, the cutoff frequency of the AFT circuit is set based on the clocks of the crystal oscillator and the synthesizer which are set with respect to the optical disk having the storage capacity of 640 MB. The cutoff frequency of the AFT circuit is set with respect to the optical disk having the storage capacity of 640 MB in this case regardless of the storage capacity of the optical disk which is loaded into the optical disk unit. Hence, it is necessary to set the clocks of the crystal oscillator and the synthesizer with respect to the optical disk having the storage capacity of 640 MB before setting the cutoff frequency of the AFT circuit. Furthermore, from a time t2b, the setting is changed to set the clocks of the crystal oscillator and the synthesizer with respect to the loaded optical disk having the storage capacity of 230 MB, and the read/write process is carried out from a time t3a to a time t4a. Accordingly, the restoration time required to restore the optical disk unit from the power save mode to the read/write mode corresponds to the time interval from the time t2 to the time t3a.

As may be seen from FIG. 1, in the case where the optical disk having the storage capacity of 230 MB is loaded into the optical disk unit in the stage where the clocks of the crystal oscillator and the synthesizer are preset with respect to the optical disk having the storage capacity of 640 MB, the restoration time required to restore the optical disk unit from the power save mode to the read/write mode is a sum of a set time from the time t2 to the time t2a, a set time from the time t2a to the time t2b, and a set time from the time t2b to the time t3a. Particularly, the set time from the time t2 to the time t2a and the set time from the time t2b to the time t3a include an oscillation stabilizing wait time of approximately 50 ms, for example, which is required for the operation of the crystal oscillator to stabilize. Therefore, there was a problem in that the restoration time became long in the prior art.

SUMMARY OF THE INVENTION

Accordingly, it is a general object of the present invention to provide a novel and useful power save mode control method and storage unit, in which the problem described above is eliminated.

Another and more specific object of the present invention is to provide a power save mode control method and storage unit, which can shorten the restoration time required to restore the storage unit from a power save mode to another mode.

Still another object of the present invention is to provide a power save mode control method for a storage unit which is loadable with recording mediums having different formats, comprising the steps of detecting whether or not a format of a recording medium loaded into the storage unit is a first format which is preset, and setting a clock frequency of a clock within the storage unit to a first frequency with respect to the recording medium having the first format when changing a mode of the storage unit to a power save mode if the loaded recording medium has the first format. According to the power save mode control method of the present invention, it is possible to reduce the restoration time required to restore the mode of the storage unit from the power save mode to another mode. In addition, if the loaded recording medium has a second format different from the first format and the clock frequency is set to a second frequency which is for the second format and is different from the first frequency when changing the mode of the storage unit from the power save mode to a predetermined mode, the clock frequency is automatically set depending on the format of the loaded recording medium, thereby making it unnecessary for the user of the storage unit to be aware of the format of the recording medium which is loaded into the storage unit.

A further object of the present invention is to provide a power save mode control method for a storage unit which is loadable with recording mediums having different storage capacities, comprising the steps of detecting whether or not a storage capacity of a recording medium loaded into the storage unit is a first storage capacity which is preset, and setting a clock frequency of a clock within the storage unit to a first frequency with respect to the recording medium having the first storage capacity when changing a mode of the storage unit to a power save mode if the loaded recording medium has the first storage capacity. According to the power save mode control method of the present invention, it is possible to reduce the restoration time required to restore the mode of the storage unit from the power save mode to another mode. In addition, if the loaded recording medium has a second storage capacity different from the first storage capacity and the clock frequency is set to a second frequency which is for the second storage capacity and is different from the first frequency when changing the mode of the storage unit from the power save mode to a predetermined mode, the clock frequency is automatically set depending on the storage capacity of the loaded recording medium, thereby making it unnecessary for the user of the storage unit to be aware of the storage capacity of the recording medium which is loaded into the storage unit.

Another object of the present invention is to provide a storage unit loadable with recording mediums having different formats, comprising means for detecting whether or not a format of a recording medium loaded into the storage unit is a first format which is preset, and means for setting a clock frequency of a clock within the storage unit to a first frequency with respect to the recording medium having the first format when changing a mode of the storage unit to a power save mode if the loaded recording medium has the first format. According to the storage unit of the present invention, it is possible to reduce the restoration time required to restore the mode of the storage unit from the power save mode to another mode. In addition, if the loaded recording medium has a second format different from the first format and the clock frequency is set to a second frequency which is for the second format and is different from the first frequency when changing the mode of the storage unit from the power save mode to a predetermined mode, the clock frequency is automatically set depending on the format of the loaded recording medium, thereby making it unnecessary for the user of the storage unit to be aware of the format of the recording medium which is loaded into the storage unit.

Other objects and further features of the present invention will be apparent from the following detailed description when read in conjunction with the accompanying drawings.

BRIEF DESCRIPTION OF THE DRAWINGS

FIGS. 11(*a*) through 11(*e*) respectively are time charts for explaining a process for carrying out a cutoff frequency setting operation of an AFT circuit.

DETAILED DESCRIPTION OF THE PREFERRED EMBODIMENTS

First, a description will be given of an embodiment of a power save mode control method according to the present invention, by referring to FIGS. 2 and 3. This embodiment of the power save mode control method is applied to an optical disk unit.

Figure 2:
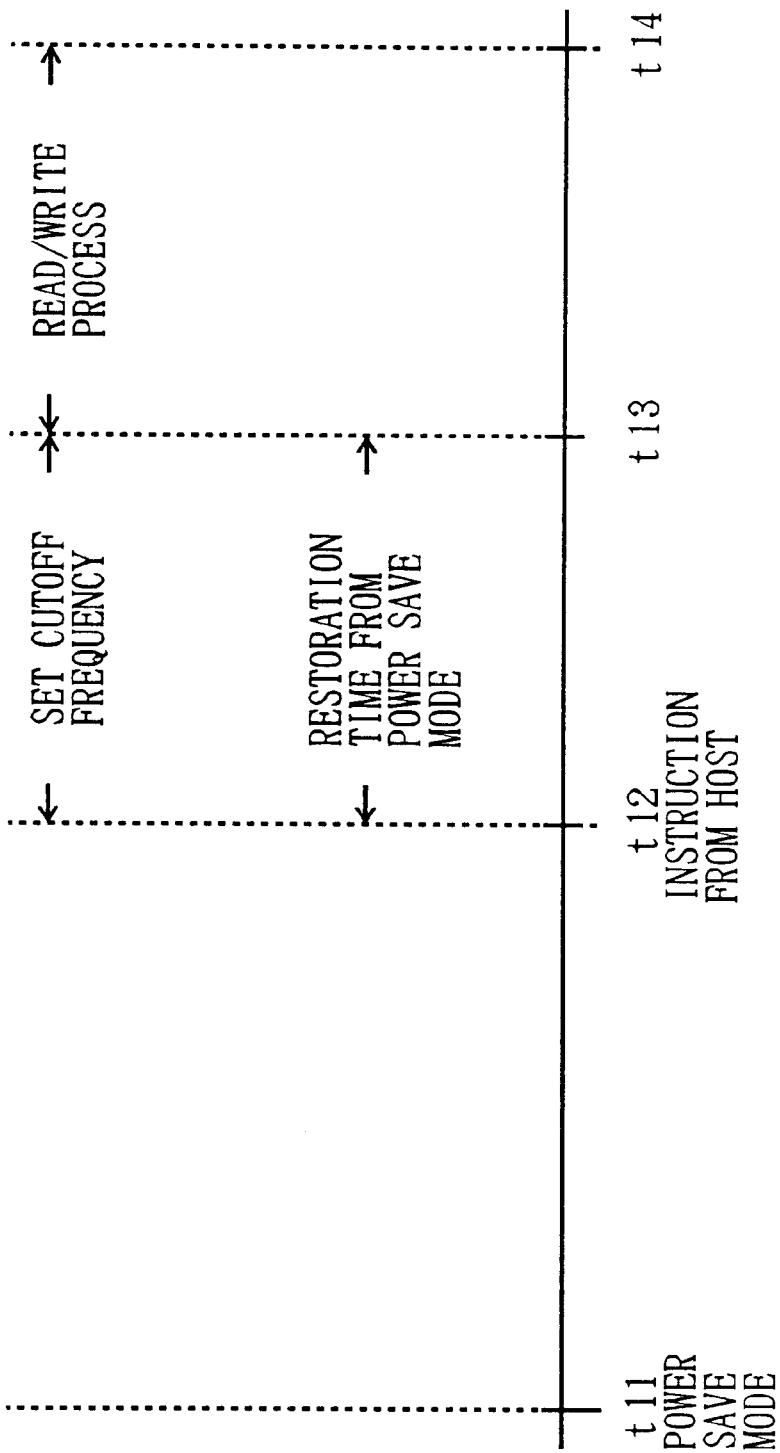
FIG. 2 is a time chart for explaining an embodiment of a power save mode control method according to the present invention.

FIG. 2 is a time chart for explaining the operation of restoring the operation mode of the optical disk unit from a power save mode to a read/write mode in a case where an optical disk having a storage capacity of 640 MB is loaded into the optical disk unit in a state where clocks of a crystal oscillator and a synthesizer of the optical disk unit are preset with respect to the optical disk having the storage capacity of 640 MB, for example. For the sake of convenience, it is assumed that the operation mode of the optical disk unit is the power save mode from a time t11, and that a read/write instruction is received from a host unit at a time t12.

From the time t12, the cutoff frequency of an AFT circuit of the optical disk unit is set based on the preset clocks of the crystal oscillator and the synthesizer. A read/write process is carried out from a time t13 to a time t14. Accordingly, a restoration time required to restore the optical disk unit from the power save mode to the read/write mode corresponds to the time interval from the time t12 to the time t13.

The optical disks supported by the optical disk unit include optical disks having different formats. For this reason, the clocks of the crystal oscillator and the synthesizer within the optical disk unit must be set depending on the format of the optical disk loaded into the optical disk unit.

Figure 3:
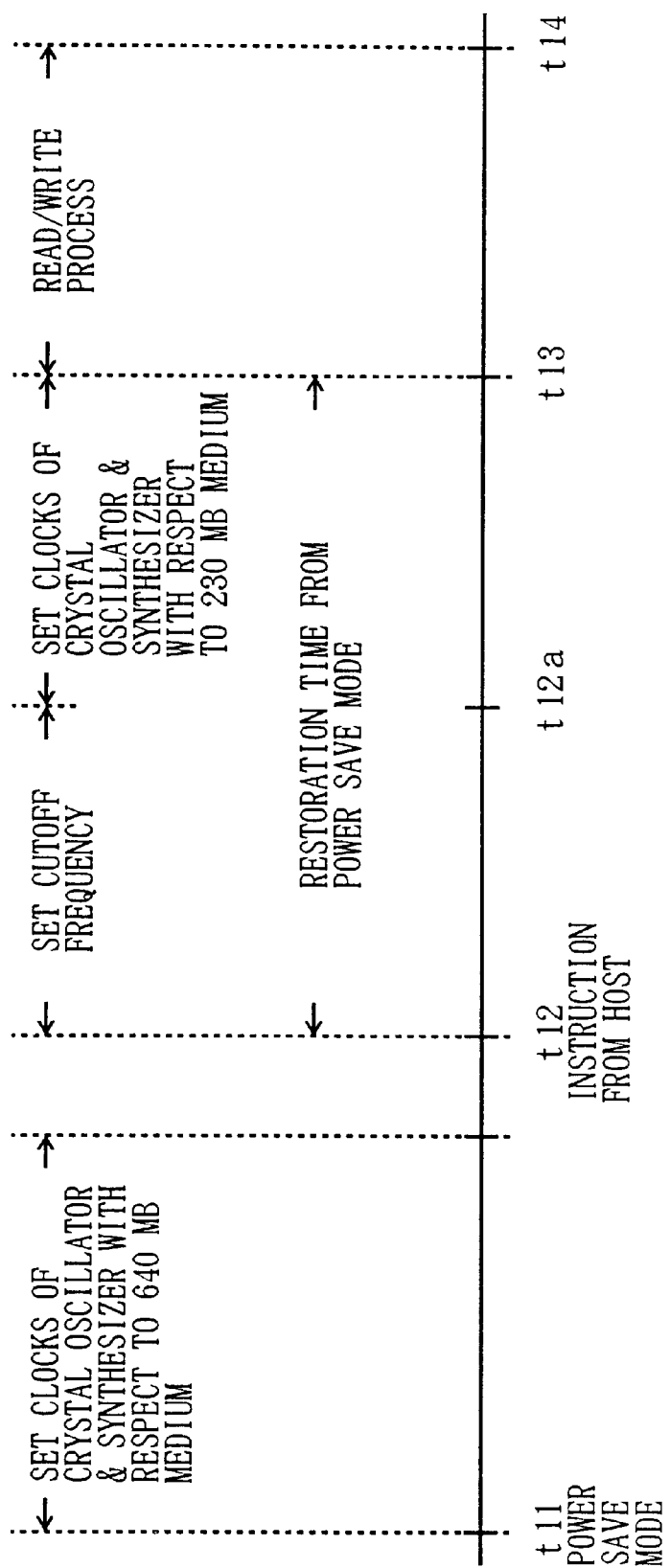
FIG. 3 is a time chart for explaining the embodiment of the power save mode control method according to the present invention.

FIG. 3 is a time chart for explaining the operation of restoring the operation mode of the optical disk unit from the power save mode to the read/write mode in this embodiment in the case where an optical disk having a storage capacity of 230 MB is loaded into the optical disk unit in a state where the clocks of the crystal oscillator and the synthesizer are preset with respect to the optical disk having the storage capacity of 640 MB. In this case, it is necessary to carry out the initial sequence of a read circuit within the optical disk unit and to change the setting so that the clocks of the crystal oscillator and the synthesizer are set with respect to the optical disk having the storage capacity of 230 MB. In FIG. 3, the operation mode of the optical disk unit is the power save mode from the time t11, and the read/write instruction is received from the host unit at the time t12.

In this case, when carrying out a restoration process on or after the time t12, there is a possibility that the clocks of the crystal oscillator and the synthesizer are set with respect to the optical disk having the storage capacity of 230 MB. For this reason, on or after the time t11 shown in FIG. 3, the setting is changed to set the clocks of the crystal oscillator and the synthesizer with respect to the optical disk having the storage capacity of 640 MB. In addition, from the time t12, the initial sequence of the read circuit within the optical disk unit is carried out, and the cutoff frequency of the AFT circuit is set based on the clocks of the crystal oscillator and the synthesizer which are set with respect to the optical disk having the storage capacity of 640 MB. The cutoff frequency of the AFT circuit is set with respect to the optical disk having the larger storage capacity of 640 MB in this case regardless of the storage capacity of the optical disk which is loaded into the optical disk unit. Hence, it is necessary to set the clocks of the crystal oscillator and the synthesizer with respect to the optical disk having the storage capacity of 640 MB before setting the cutoff frequency of the AFT circuit. Furthermore, from a time t12a, the setting is changed to set the clocks of the crystal oscillator and the synthesizer with respect to the loaded optical disk having the storage capacity of 230 MB, and a read/write process is carried out from a time t13 to a time t14. Accordingly, the restoration time required to restore the optical disk unit from the power save mode to the read/write mode corresponds to the time interval from the time t12 to the time t13.

Figure 1:
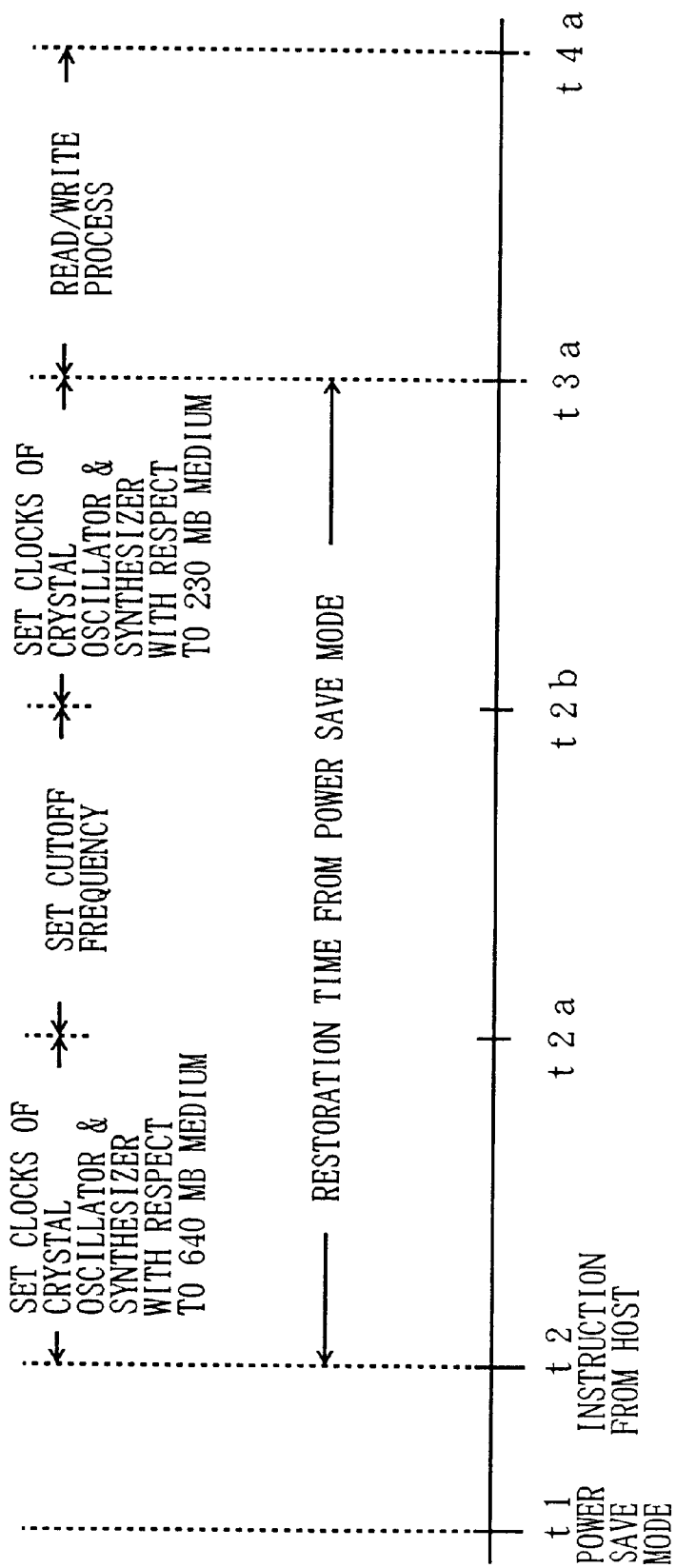
FIG. 1 is a time chart for explaining the operation of restoring an optical disk unit from a power save mode to a read/write mode according to the prior art.

Therefore, this embodiment changes the setting when starting the power save mode so as to set the clocks of the crystal oscillator and the synthesizer with respect to the optical disk having the storage capacity of 640 MB. For this reason, when carrying out the restoration process by carrying out the initial sequence of the read circuit within the optical disk unit on and after the time t12, there is no need to change the setting of the clocks of the crystal oscillator and the synthesizer. As may be seen by comparing FIG. 3 and the prior art FIG. 1 described above, this embodiment can shorten the restoration time by an amount corresponding to the time it takes in the prior art to change the setting of the clocks of the crystal oscillator and the synthesizer.

In a case where a plurality of power save modes are provided in the optical disk unit, it is possible to change the setting of the clock of the crystal oscillator and the synthesizer at the start of one of the plurality of power save modes. In this case, it is possible to change the setting of the clock of the crystal oscillator and the synthesizer at the start of one of the plurality of power save modes, such as a power save mode in which the read circuit within the optical disk unit is stopped and a power save mode in which the power consumption of the optical disk unit is a maximum.

Figure 4:
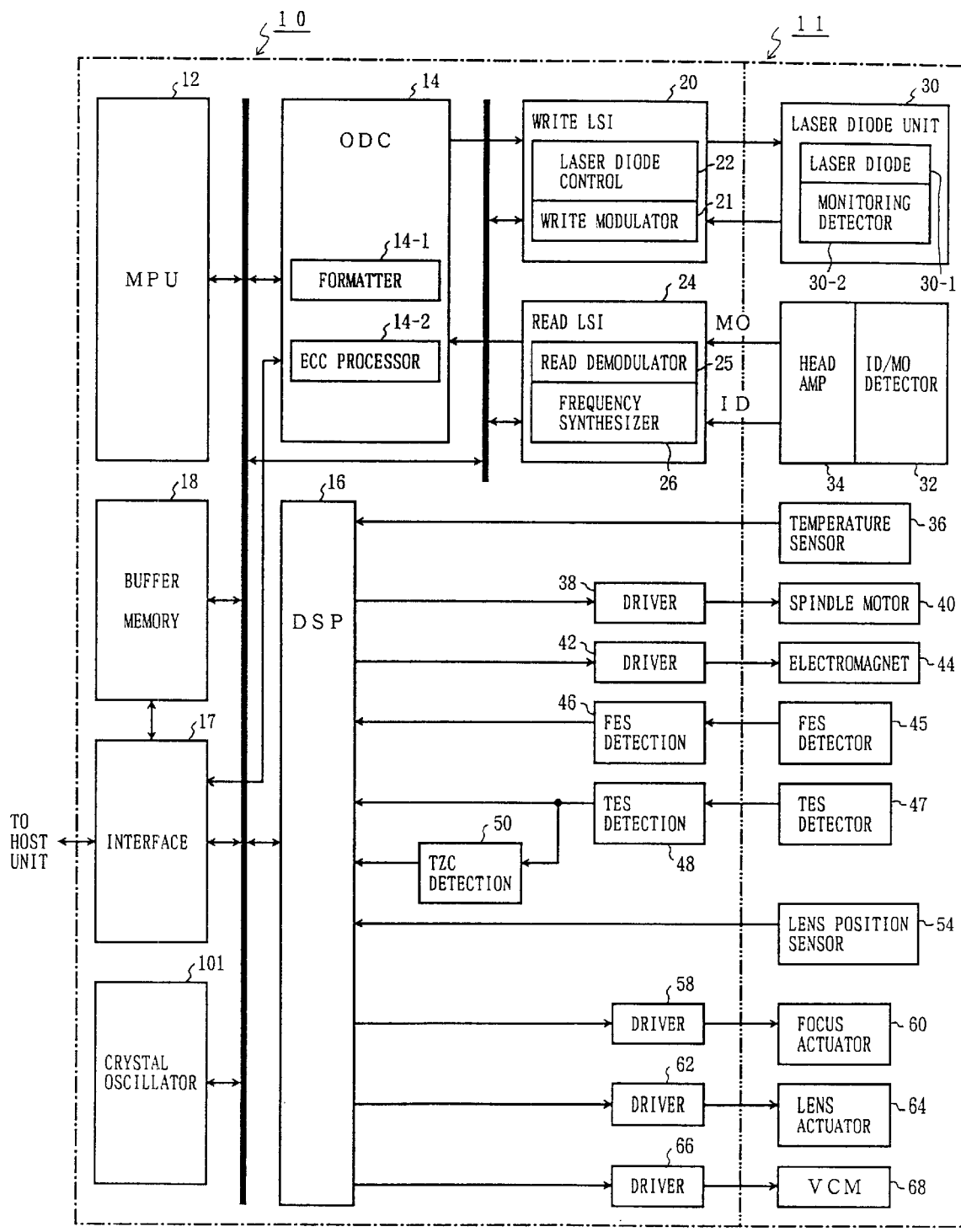
FIG. 4 is a system block diagram showing the general construction of an embodiment of a storage unit according to the present invention.

Next, a description will be given of an embodiment of a storage unit according to the present invention, by referring to FIGS. 4 through 11. FIG. 4 is a system block diagram showing the general construction of this embodiment of the storage unit. In this embodiment of the storage unit, the present invention is applied to an optical disk unit.

As shown in FIG. 4, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read/write data with respect to an optical disk (not shown), a digital signal processor (DSP) 16, and a buffer memory 18. The buffer memory 18 is used in common by the MPU 12, the ODC 14 and the interface 17, and includes a dynamic random access memory (DRAM), for example. A crystal oscillator 101 is coupled to the MPU 12.

The ODC 14 includes a formatter 14-1 and error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1-7 run length limited (RLL) code, for example.

At the time of a read access, a reverse conversion of the 1-7 RLL is carried out with respect to the sector data, and after carrying out the CRC, the error detection and error correction using the ECC are carried out in the ECC processor 14-2. Further, the NRZ data in sector units are connected in the formatter 14-2 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment can use any one of writable magneto-optic (MO) cartridge mediums having the storage capacities of 128 MB, 230 MB, 540 MB and 640 MB. In the MO cartridge mediums having the storage capacities of 128 MB and 230 MB, the PPM recording is employed to record the data in correspondence with the existence and non-existence of marks on the optical disk. In addition, a zone constant angular velocity (CAV) is used as the recording format of the optical disk, where 1 zone is provided as a user region in the case of the optical disk having the storage capacity of 128 MB and 10 zones are provided as the user region in the case of the optical disk having the storage capacity of 230 MB.

In the MO cartridge mediums having the storage capacities of 540 MB and 640 MB and used for the high density recording, the PWM recording is employed to record the data in correspondence with the edges of the marks, that is, leading and trailing edges, on the optical disk. The difference between the storage capacities of the optical disk having the storage capacity of 540 MB and the optical disk having the storage capacity of 640 MB is due to the different sector capacities. The optical disk has the storage capacity of 540 MB if the sector capacity is 512 bytes, and the optical disk has the storage capacity of 640 MB if the sector capacity is 2048 bytes. In addition, the zone CAV is used as the recording format of the optical disk, where 18 zones are provided as the user region in the case of the optical disk having the storage capacity of 540 MB and 11 zones are provided as the user region in the case of the optical disk having the storage capacity of 640 MB.

Hence, this embodiment can cope with the optical disks having the storage capacities of 128 MB, 230 MB, 540 MB and 640 MB, and also cope with direct overwrite type optical disks having the storage capacities of 230 MB, 540 MB and 640 MB. Accordingly, when the optical disk is loaded into the optical disk unit, an identification (ID) part of the optical disk is first read so as to recognize the type of the optical disk by the MPU 12 from the intervals of the pits, and a recognition result of the type of loaded optical disk is notified to the ODC 14.

A read LSI circuit 24 is provided as a read system with respect to the ODC 14. A read demodulator 25 and a frequency synthesizer 26 are provided in the read LSI circuit 24. An. ID/MO detector 32 of the enclosure 11 detects a laser beam emitted from the laser diode 30-1 and returned via the optical disk, and a detection signal from this ID/MO detector 32 is input as an ID signal and a MOD signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PPM data or the PWM data back into the original NRZ data. In addition, since the zone CAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked: loop (PLL) circuit having a programmable frequency divider, and generates as a read clock a reference clock having a predetermined specific frequency depending on the zone position on the optical disk. In other words, the frequency synthesizer 26 is formed by the PLL circuit having the programmable frequency divider, and generates the reference clock having a frequency fo based on fo=(m/n).fi according to a frequency dividing ratio m/n which is set by the MPU 12 depending on a zone number.

A denominator n of the frequency dividing ratio m/n is a specific value depending on the type of optical disk having the storage capacity of 128 MB, 230 MB, 540 MB or 640 MB. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a reference clock frequency generated outside the frequency synthesizer 26.

The read data demodulated in the read LSI circuit 24 is supplied to the read system of the ODC 14, and after carrying out the reverse conversion of the 1-7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit via the buffer memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the zone CAV is employed as the recording format of the optical disk, the spindle motor 40 is rotated at a constant speed of 3000 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and,returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 52 is provided in the enclosure 11. This lens position sensor 52 detects a position of an objective lens through which the laser beam is irradiated on the optical disk. A lens position detection signal (LPOS) E4 from the lens position sensor 52 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 5:
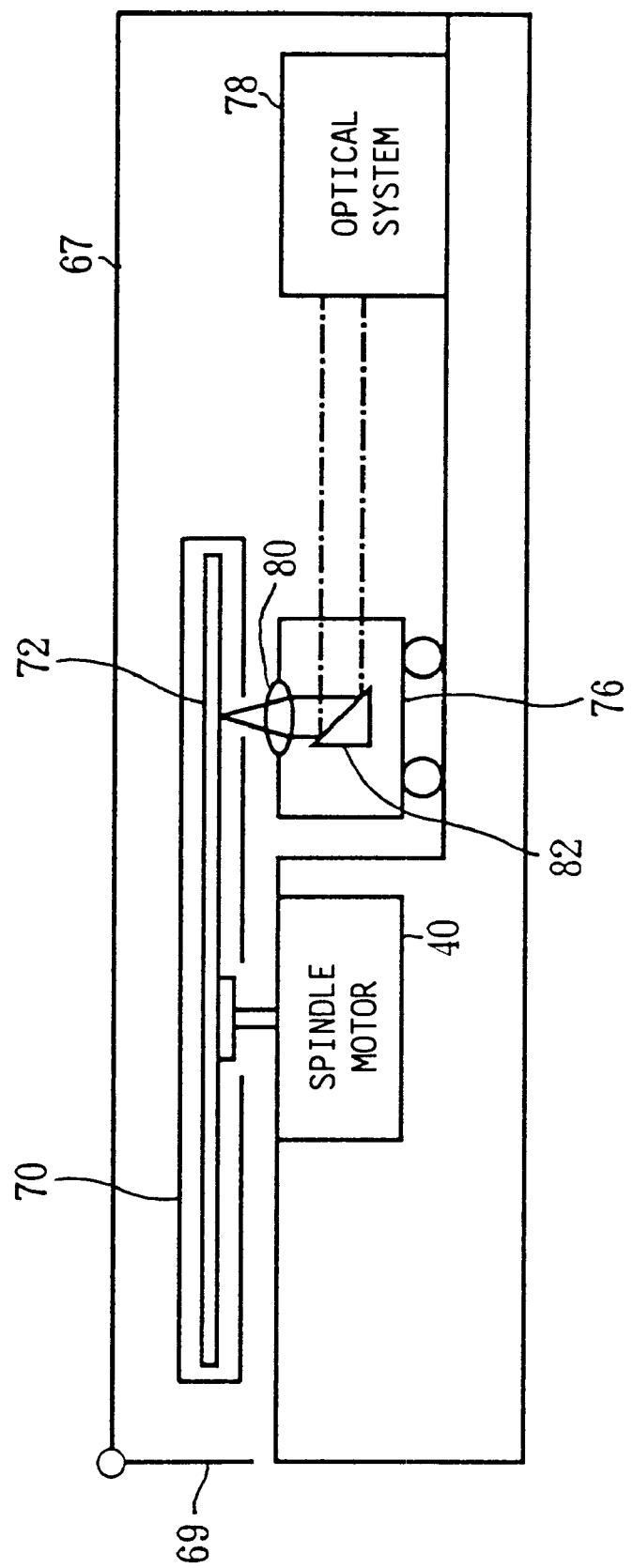
FIG. 5 is a cross sectional view showing the general construction of an enclosure.

FIG. 5 is a cross sectional view showing the general construction of the enclosure 11. As shown in FIG. 5, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below loaded the optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure 11 shown in FIG. 4. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 4. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Figure 6:
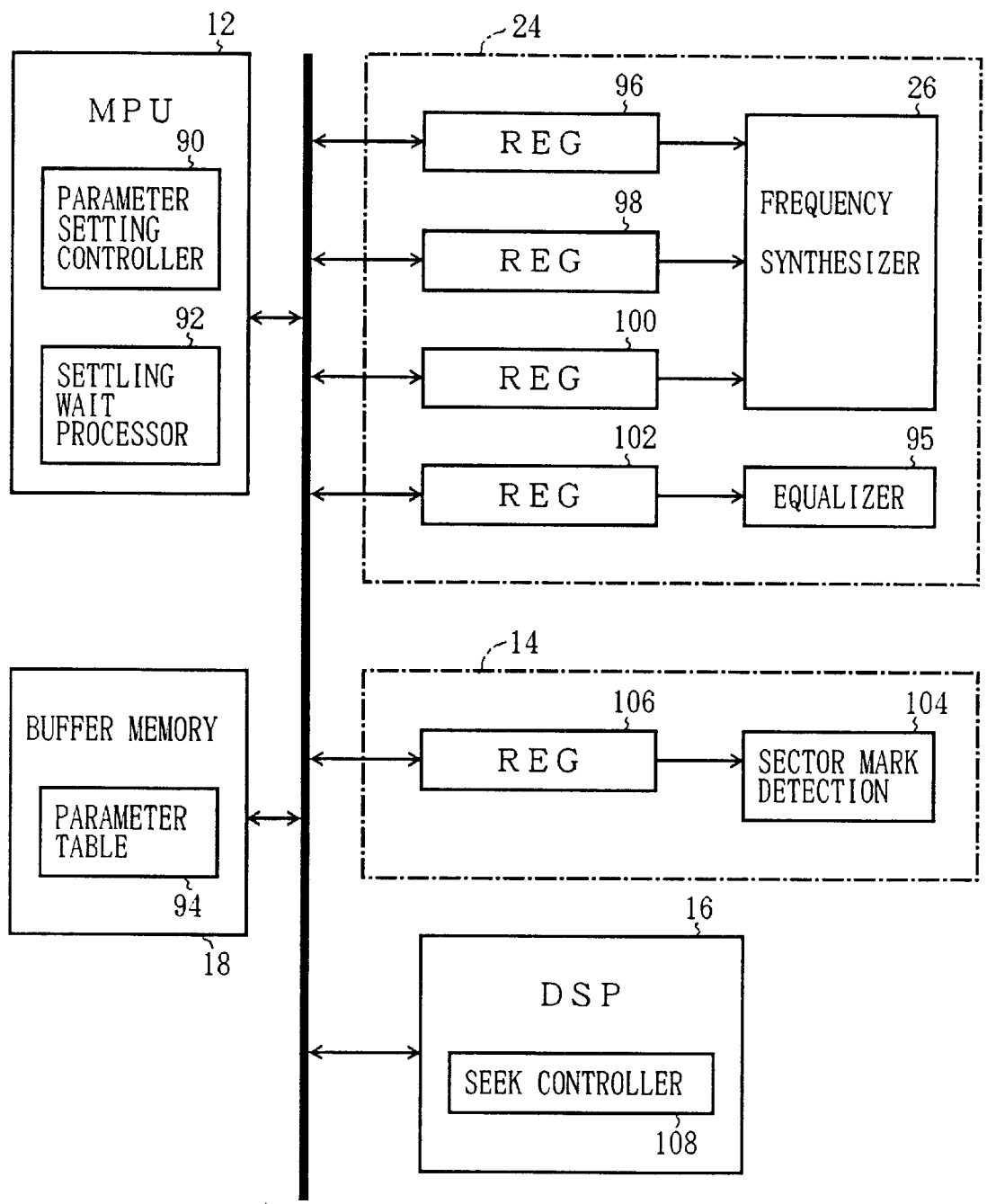
FIG. 6 is a system block diagram for explaining the parameter setting control and settling wait functions of a microprocessor unit (MPU) of an optical disk unit with respect to a read large scale integrated (LSI) circuit, an optical disk controller (ODC) and a digital signal processor (DSP)

FIG. 6 is a system block diagram for explaining the parameter setting control and settling wait functions of the MPU 12 of the optical disk unit shown in FIG. 4 with respect to the read LSI circuit 24, the ODC 14 and the DSP 16.

The MPU 12 includes a parameter setting controller 90 which operates based on a read command from the host unit, and a settling wait processor 92 for waiting the settling after the parameter setting. The parameter setting controller 90 controls the setting of the parameters which are required to make various kinds of accesses by use of a parameter table 94 which is developed in a RAM or the like included in the buffer memory 18.

Elements the parameters of which are to be set by the parameter setting controller 90 of the MPU 12 include the frequency synthesizer 26 and an equalizer circuit 95 within the read LSI circuit 24. The equalizer circuit 95 is provided with respect to the MO signal which is obtained from the ID/MO detector 32. In this embodiment, 3 control registers 96, 98 and 100 are provided with respect to the frequency synthesizer 26.

The parameters related to the frequency dividing ratio m/n, the frequency setting of a voltage controller oscillator (VCO) and the selection of a PLL damping resistance are respectively set in the control registers 96, 98 and 100 by the parameter setting controller 90 of the MPU 12. A control register 102 is provided with respect to the equalizer circuit 95. Parameters related to an equalizer cutoff frequency are set in the control register 102 by the parameter setting controller 90 of the MPU 12. Furthermore, a control register 106 is provided with respect to a sector mark detection circuit 104 of the ODC 14. Parameters related to a sector mark detection cutoff frequency are set in the control register 106 by the parameter setting controller 90 of the MPU 12.

A seek command is transferred to the DSP 16 when the MPU 12 executes a read command from the host unit. The DSP 16 is provided with a seek controller 108. Based on the seek command, the seek controller 108 of the DSP 16 carries out a seek control for positioning the beam spot to a target track on the optical disk 72 simultaneously in parallel with the process of the MPU 12.

Therefore, the parameter setting controller 90 of the MPU 12 can optimize the cutoff frequency of the MO signal equalizer circuit 95 within the read LSI circuit 24 by controlling the setting of the control register 102. In addition, the parameter setting controller 90 can optimize the frequency dividing ratio m/n, the VCO frequency setting and the PLL damping resistance selection of the frequency synthesizer 26 within the read LSI circuit 24 by controlling the setting of the control registers 96, 98 and 100. Furthermore, the parameter setting controller 90 can optimize the cutoff frequency of the sector mark detection circuit 104 within the ODC 14 by controlling the setting of the control register 106.

Figure 7:
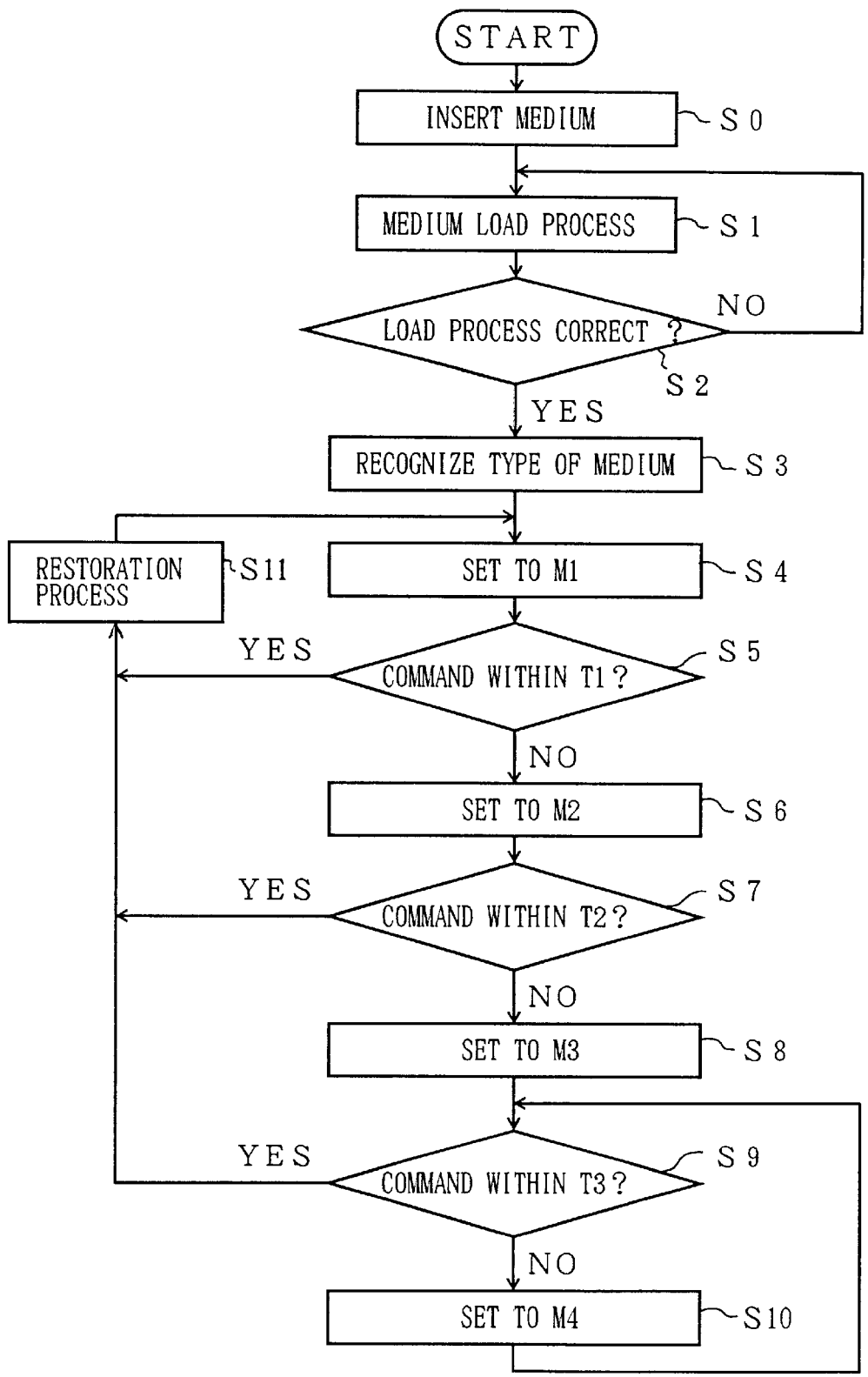
FIG. 7 is a flow chart for explaining a change to the power save mode.

In this embodiment, a plurality of power save modes are provided, and one power save mode which most efficiently reduces the power consumption of the optical disk unit is selected depending on the state of use of the optical disk unit. FIG. 7 is a flow chart for explaining a change to a power save mode in this embodiment. The process shown in FIG. 7 corresponds to the operation of the MPU 12 shown in FIG. 4. For the sake of convenience, it is assumed that the optical disk unit is preset with respect to an optical disk having the storage capacity of 640 MB, and that an optical disk 72 having the storage capacity of 230 MB is actually loaded into the optical disk unit.

In FIG. 7, when a step S0 detects by a known means that the optical disk 72 is inserted into the enclosure 11 of the optical disk unit, a step S1 carries out a load process to engage the optical disk 72 to a hub of the rotary shaft of the spindle motor 40. A step S2 decides by a known means whether or not the load process is carried out correctly, and the process returns to the step S0 if the decision result in the step S2 is NO. On the other hand, if the decision result in the step S2 is YES, a step S3 reads the ID part of the loaded optical disk 72, recognizes the type of optical disk from the intervals of the pits on the optical disk 82, and notifies the recognition result to the ODC 14 as described above. Hence, in this state, the type of the loaded optical disk 72, that is, the format of the loaded optical disk 72 including the storage capacity of the loaded optical disk 72 is already recognized. The process advances to a step S4 after the step S3.

The step S4 sets the operation mode of the optical disk unit to a power save mode M1. In the power save mode M1, the read LSI circuit 24 shown in FIG. 4 is stopped. In addition, in a case where the step S3 recognizes that the loaded optical disk 72 has the storage capacity of 230 MB, the step S4 sets the clocks of the crystal oscillator 101 and the frequency synthesizer 26 within the read LSI circuit 24 with respect to the optical disk having the storage capacity of 640 MB as described above in conjunction with FIG. 3. In a case where the step S3 recognizes that the loaded optical disk 72 has the storage capacity of 640 MB, the process of setting the clocks of the crystal oscillator 101 and the frequency synthesizer 26 within the read LSI circuit 24 with respect to the optical disk having the storage capacity of 640 MB is not carried out as described above in conjunction with FIG. 2.

A step S5 decides whether or not a command is received from the host unit within a predetermined time T1. If the decision result in the step S5 is NO, a step S6 sets the operation mode of the optical disk unit to a power save mode M2. In the power save mode M2, the crystal oscillator 101, the frequency synthesizer 26, the drivers 58, 62 and 66, the head, amplifier 34, amplifiers within the FES detection circuit 46 and the TES detection circuit 48 and the like are stopped. Moreover, clocks of the DSP 16, the ODC 14 and the MPU 12 are reduced, and a refresh operation of the DRAM included in the buffer memory 18 is reduced by 1 level in this power save mode M2.

A step S7 decides whether or not a command is received from the host unit within a predetermined time T2, where T2>T1. If the decision result in the step S7 is NO, a step S8 sets the operation mode of the optical disk unit to a power save mode M3. In the power save mode M3, the laser diode 30-1, the spindle motor 40 and the like are stopped. In addition, the clock of the DSP 16 is stopped, and the refresh operation of the DRAM included in the buffer memory 18 is further reduced by 1 more level in this power save mode M3 as compared to the power save mode M2.

A step S9 decides whether or not a command is received from the host unit within a predetermined time T3, where T3>T2. If the decision result in the step S9 is NO, a step S10 sets the operation mode of the optical disk unit to a power save mode M4. In the power save mode M4, the operation of the MPU 12, the refresh operation of the DRAM included in the buffer memory 18 and the like are stopped in a certain host interface. After the step S10, the process returns to the step S9.

On the other hand, if the decision result in the step S5, S7 or S9 is YES, the process advances to a step S11. The step S11 carries out a restoration process to restore the operation mode of the optical disk unit from the power save mode to a mode other than the power save mode, and also carries out a read/write process. The operation returns to the step S4 after the step S11.

Figure 8:
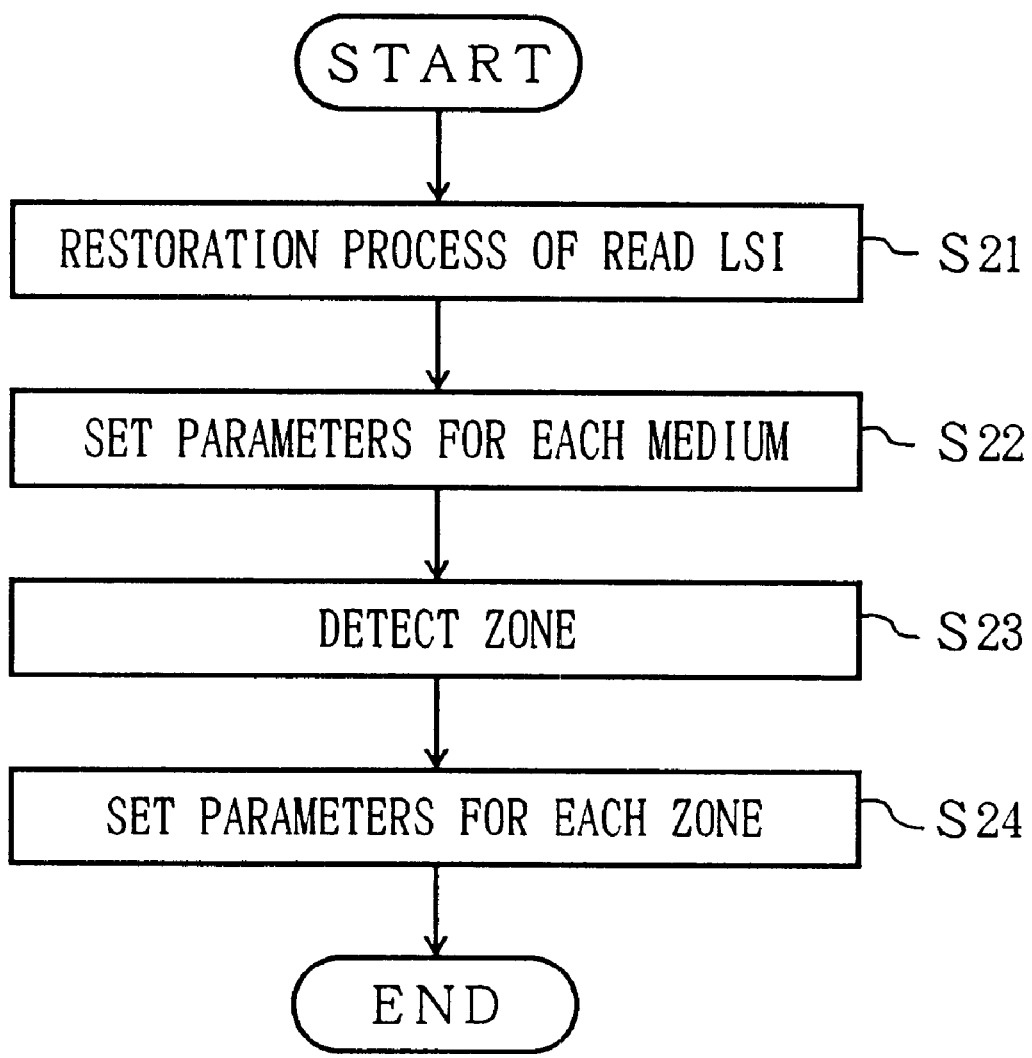
FIG. 8 is a flow chart for explaining a restoration process of a step S11 shown in FIG. 7.

FIG. 8 is a flow chart for explaining the restoration process of the step S11 shown in FIG. 7. In FIG. 8, a step S21 carries out a restoration process of the read LSI circuit 24, and a step S22 sets the parameters for the loaded optical disk 72 with respect to the read LSI circuit 24. A step S23 detects the zone on the optical disk 72. A step S24 sets the parameters for each zone on the optical disk 72 with respect to the read LSI circuit 24, and the process ends.

Figure 9:
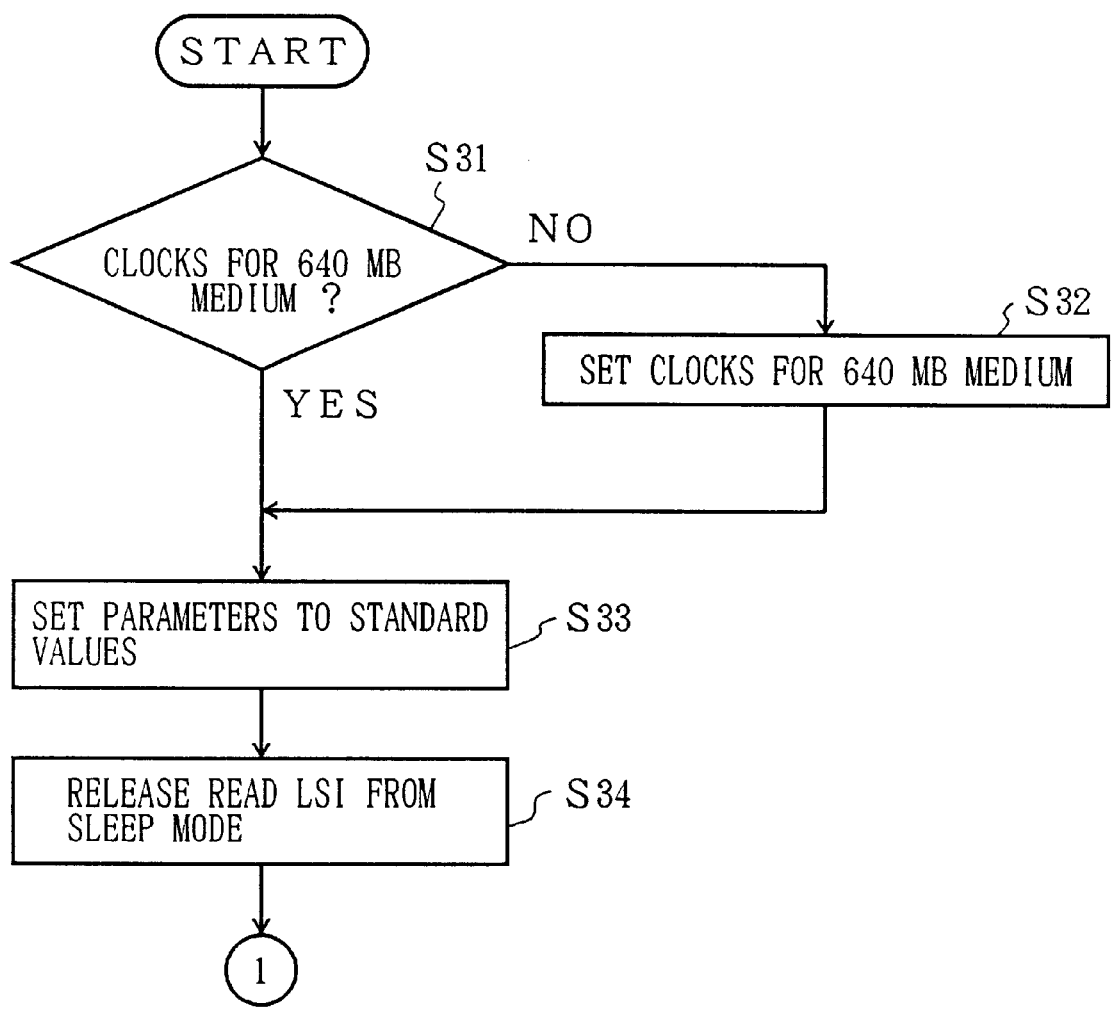
FIG. 9 is a flow chart for explaining a restoration process of the read LSI circuit of a step S21 shown in FIG. 8.
Figure 10:
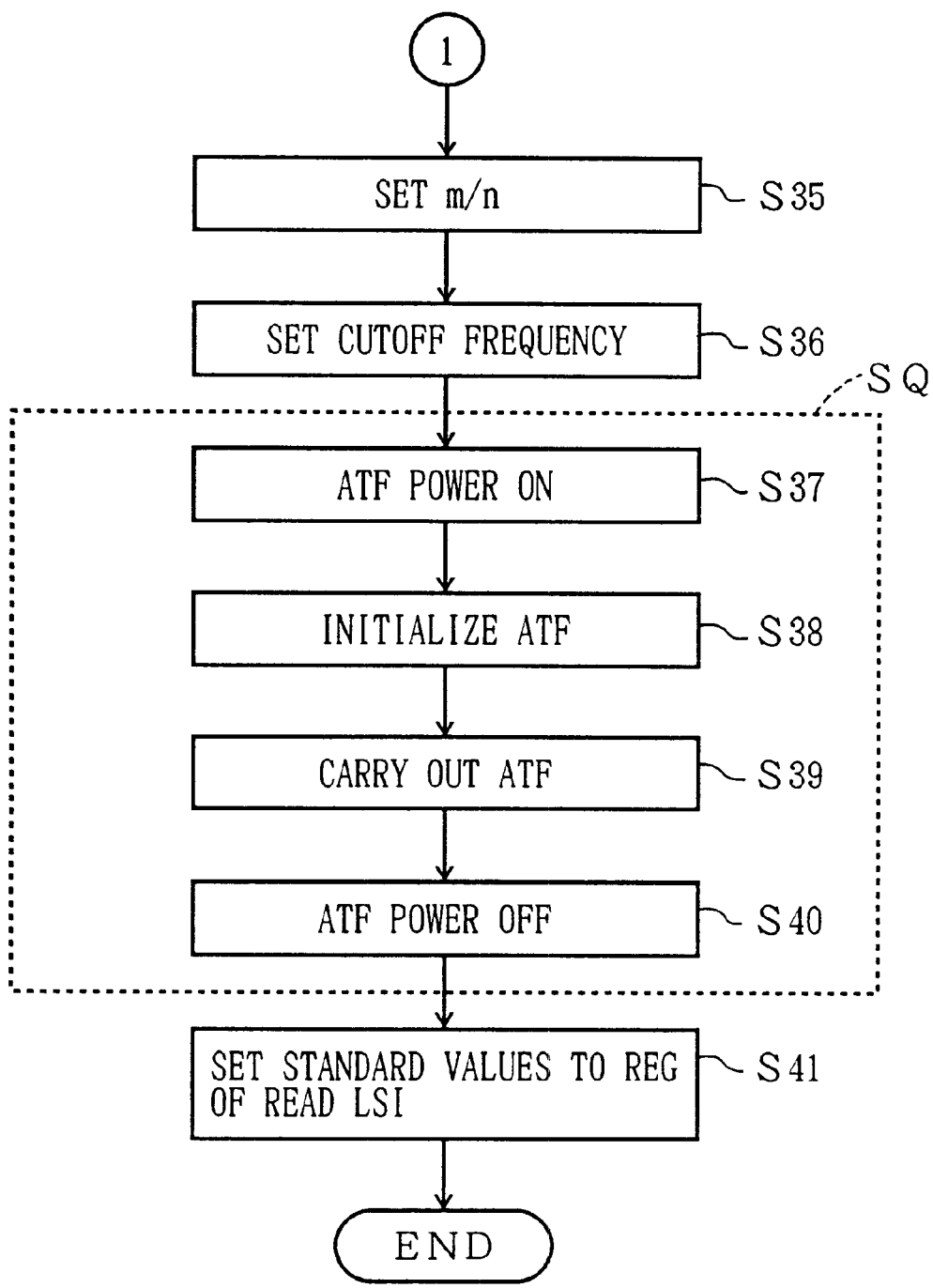
FIG. 10 is a flow chart for explaining the restoration process of the read LSI circuit of the step S21 shown in FIG. 8.

FIGS. 9 and 10 are flow charts for explaining a restoration process of the read LSI circuit 24 of the step S21 shown in FIG. 8. In FIG. 8, a step S31 decides whether or not the clocks of the crystal oscillator 101 and the frequency synthesizer 26 are set with respect to the optical disk having the storage capacity of 640 MB. If the decision result in the step S31 is NO, a step S32 sets the clocks of the crystal oscillator 101 and the frequency synthesizer 26 with respect to the optical disk having the storage capacity of 640 MB. If the decision result in the step S31 is YES or after the step S32, a step S33 sets the parameters related to the equalizer boost, peak clamp, A.C. sag canceller amplitude correction and the like to standard values by controlling the setting with respect to the control registers 96, 98 and 100. In addition, a step S34 releases the read LSI circuit 24 from the stopped state (sleep mode). After the step S34, the process advances to a step S35 shown in 10 FIG. 10.

In FIG. 10, the step S35 sets the frequency dividing ratio m/n, the frequency dividing ratio of the VCO frequency and the frequency dividing ratio of the reference clock of the frequency synthesizer 26. A step S36 determines the cutoff frequency within the read LSI circuit 24 for the normal state and at the time of the sector mark detection. A sequence SQ including steps S37 through S40 corresponds to the operation of setting the cutoff frequency of the AFT circuit. The step S37 puts the power of the AFT circuit to an ON state, and the step S38 initializes the AFT circuit. The step S39 carries out the automatic frequency tuning by the AFT circuit, and the step S40 puts the power of the AFT circuit to an OFF state. A step S41 sets the cutoff frequency of the MO signal equalizer circuit 95 in the control register 102 within the read LSI circuit 24, and the process ends.

FIGS. 11(a) through 11(e) are time charts for explaining the a process for carrying out the cutoff frequency setting operation of the AFT circuit in this embodiment. FIG. 11(a) shows a setting timing for setting the parameters related to the frequency dividing ratio m/n of the frequency synthesizer 26, the VCO frequency and the PLL damping resistance. FIG. 11(b) shows a setting timing for setting the reference clock of the frequency synthesizer 26. FIG. 11(c) shows a timing for determining the cutoff frequency WHEN detecting the sector mark by the sector mark detection circuit 104. FIG. 11(d) shows a settling wait timing. In addition, FIG. 11(e) shows a timing for setting the cutoff frequency of the AFT circuit.

Further, the present invention is not limited to these embodiments, but various variations and modifications may be made without departing from the scope of the present invention.

What is claimed is:

1. A power save mode control method for a storage unit which is loadable with recording media having different formats, comprising the steps of:

detecting whether or not a format of a recording medium loaded into the storage unit is a first format which is preset; and setting a clock frequency of a clock within the storage unit to a first frequency corresponding to said first preset format when changing an operational mode of the storage unit to a power save mode if said loaded recording medium has a format other than the first preset format, prior to restoration of said operational mode from said power save mode to a different operational mode.

2. The power save mode control method as claimed in claim 1, which further comprises the steps of:

detecting whether or not the format of the loaded recording medium is a second format which is different from the first format; and setting the clock frequency to a second frequency with respect to the recording medium having the second format when changing the mode of the storage unit to a predetermined mode from the power save mode, said second frequency being different from the first frequency.

3. The power save mode control method as claimed in claim 2, wherein the predetermined mode is a read/write mode.

4. The power save mode control method as claimed in claim 1, wherein the power save mode is one of a plurality of power save modes of the storage unit.

5. The power save mode control method as claimed in claim 1, wherein the clock sets a cutoff frequency of an automatic frequency tuning circuit within the storage unit for automatically selecting and tuning one of a plurality of crystal oscillators.

6. A power save mode control method for a storage unit which is loadable with recording media having different storage capacities, comprising the steps of:

detecting whether or not a storage capacity of a recording medium loaded into the storage unit is a first storage capacity which is preset; and setting a clock frequency of a clock within the storage unit to a first frequency corresponding to said first preset storage capacity when changing an operational mode of the storage unit to a power save mode if said loaded recording medium has a storage capacity other than the first preset storage capacity, prior to restoration of said operational mode from said power save mode to a different operational mode.

7. A storage unit which is loadable with recording media having different formats, comprising:

means for detecting whether or not a format of a recording medium loaded into the storage unit is a first format which is preset; and means for setting a clock frequency of a clock within the storage unit to a first frequency corresponding to said first preset format when changing an operational mode of the storage unit to a power save mode if said loaded recording medium has a format other than the first preset format, prior to restoration of said operational mode from said power save mode to a different operational mode.

8. The storage unit as claimed in claim 7, which further comprises:

means for detecting whether or not the format of the loaded recording medium is a second format which is different from the first format; and means for setting the clock frequency to a second frequency with respect to the recording medium having the second format when changing the mode of the storage unit to a predetermined mode from the power save mode, said second frequency being different from the first frequency.

9. The storage unit as claimed in claim 8, wherein the predetermined mode is a read/write mode.

10. The storage unit as claimed in claim 7, wherein the power save mode is one of a plurality of power save modes of the storage unit.

11. The storage unit as claimed in claim 7, which further comprises:

an automatic frequency tuning circuit for automatically selecting and tuning one of a plurality of crystal oscillators, the clock setting a cutoff frequency of said automatic frequency tuning circuit.

12. The storage unit as claimed in claim 7, which further comprises:

means for determining the format of the loaded recording medium based on information read from the loaded recording medium.

13. A storage unit which is loadable with recording media having different formats, comprising:

a detecting section which detects whether or not a format of a recording medium loaded into the storage unit is a first format which is preset; and a setting section which sets a clock frequency of a clock within the storage unit to a first frequency corresponding to said first preset format when changing an operational mode of the storage unit to a power save mode if said loaded recording medium has a format other than the first preset format, prior to restoration of said operational mode from said power save mode to a different operational mode.

14. A storage unit which is loadable with recording media having different formats, comprising:

a detecting section which detects whether or not a storage capacity of a recording medium loaded into the storage unit has a first storage capacity which is preset; and a setting section which sets a clock frequency of a clock within the storage unit to a first frequency corresponding to said first preset storage capacity when changing an operational mode of the storage unit to a power save mode if said loaded recording medium has a storage capacity other than the first preset storage capacity, prior to restoration of said operational mode from said power save mode to a different operational mode.

15. A power save mode control method for a storage unit which is loadable with recording media having different formats, comprising the steps of:

detecting whether or not a format of a recording medium loaded into the storage unit is a first format which is preset; and if said loaded recording medium has a format other than the first preset format, setting a clock frequency of a clock within the storage unit to a first frequency corresponding to said first preset format, said clock frequency setting step being performed at a time when changing an operational mode of the storage unit to a power save mode, said time being prior to a restoration process of said operational mode from said power save mode to a different operational mode.

* * * * *

UNITED STATES PATENT AND TRADEMARK OFFICE
CERTIFICATE OF CORRECTION

PATENT NO.    : 6,381,204 B1
DATED         : April 30, 2002
INVENTOR(S)   : Kobayashi et al.

It is certified that error appears in the above-identified patent and that said Letters Patent is hereby corrected as shown below:

Column 12,
Line 37, after "preset format," insert -- wherein said clock frequency setting step is completed --.
Line 37, after "prior to" insert -- beginning --.

Column 13,
Line 6, after "storage capacity," insert -- wherein said clock frequency setting step is completed --.
Line 6, after "prior to" insert -- beginning --.
Line 19, after "preset format," insert -- wherein said clock frequency setting means finishes setting said clock frequency to said first frequency --.
Line 19, after "prior to" insert -- beginning --.

Column 14,
Line 14, after "preset format" insert -- wherein said setting section finishes setting said clock frequency to said first frequency --.
Line 14, after "prior to" insert -- beginning --.
Line 28, after "preset storage capacity" insert -- wherein said setting section finishes setting said clock frequency to said first frequency --.
Line 29, after "prior to" insert -- beginning --.
Line 43, after "said time being" insert -- completed --.
Line 43, after "prior to" insert -- beginning --.

Signed and Sealed this

Tenth Day of June, 2003

JAMES E. ROGAN
*Director of the United States Patent and Trademark Office*